(12) United States Patent
Marchal (10) Patent No.: US 11,454,365 B2
(45) Date of Patent: Sep. 27, 2022

(54) LUMINOUS MODULE FOR VEHICLE LIGHTING DEVICE WITH DEVIATING LIGHT GUIDE

(71) Applicant: VALEO VISION, Bobigny (FR)

(72) Inventor: Orane Marchal, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/288,349

(22) PCT Filed: Oct. 15, 2019

(86) PCT No.: PCT/EP2019/077969
§ 371 (c)(1),
(2) Date: Apr. 23, 2021

(87) PCT Pub. No.: WO2020/083711
PCT Pub. Date: Apr. 30, 2020

(65) Prior Publication Data
US 2021/0381669 A1     Dec. 9, 2021

(30) Foreign Application Priority Data

Oct. 25, 2018   (FR) ...................................... 1859869

(51) Int. Cl.
*F21S 41/24*   (2018.01)
*F21S 41/143*   (2018.01)
(Continued)

(52) U.S. Cl.
CPC ............. *F21S 41/24* (2018.01); *F21S 41/143* (2018.01); *F21S 41/151* (2018.01);
(Continued)

(58) Field of Classification Search
CPC ......... F21V 5/007; F21S 41/153; F21S 41/24; F21S 41/143; F21S 41/255; F21S 41/151
See application file for complete search history.

(56) References Cited

U.S. PATENT DOCUMENTS

| | | | |
|---|---|---|---|
| 2015/0167913 A1* | 6/2015 | Stefanov | F21S 41/663 362/511 |
| 2019/0113198 A1* | 4/2019 | Mornet | F21S 41/143 |
| 2020/0032973 A1* | 1/2020 | Renaud | F21S 41/285 |

FOREIGN PATENT DOCUMENTS

| | | |
|---|---|---|
| EP | 2 306 073 A2 | 4/2011 |
| EP | 2 306 074 A2 | 4/2011 |

(Continued)

OTHER PUBLICATIONS

Courcier, Primary optical element, lighting module and headlight for motor vehicle, 2014, EP2743567A1, English Language Translation by Google Patents https://patents.google.com/patent/EP2743567A1/en?oq=ep2743567 (Year: 2014).*

(Continued)

*Primary Examiner* — Rajarshi Chakraborty
*Assistant Examiner* — Michael Chiang
(74) *Attorney, Agent, or Firm* — Oblon, McClelland, Maier & Neustadt, L.L.P.

(57) ABSTRACT

A vehicle luminous module intended to generate a light beam along an optical axis includes primary light guides each including an entrance dioptric interface and an exit, and a light source arranged facing an entrance dioptric interface. A projecting assembly includes a focal region and an exit member, the projecting assembly being arranged so that the light rays passing through said focal region and reaching the exit member are imaged in a projection field downstream of said projecting assembly. The exits of the guides are arranged level with the focal region. The luminous module includes at least one secondary light guide distinct from the primary light guides, and arranged so as to deviate light rays generated by the light source so that they do not reach the exit member, and/or so as to spread said light rays in said projection field.

20 Claims, 4 Drawing Sheets

(51) Int. Cl.
*F21S 41/255* (2018.01)
*F21S 41/151* (2018.01)
*F21S 41/27* (2018.01)
*F21S 41/663* (2018.01)
*F21Y 115/10* (2016.01)

(52) U.S. Cl.
CPC .......... *F21S 41/255* (2018.01); *F21S 41/27* (2018.01); *F21S 41/663* (2018.01); *F21Y 2115/10* (2016.08)

(56) References Cited

FOREIGN PATENT DOCUMENTS

| EP | 2 743 567 A1 | 6/2014 | |
|---|---|---|---|
| EP | 2743567 A1 * | 6/2014 | .......... F21S 48/1154 |
| EP | 2306073 B1 * | 4/2017 | ............ F21S 41/143 |

OTHER PUBLICATIONS

Stefanov, Light module for a lighting device of a motor vehicle, 2017, EP2306073B1, English Language Translation by Google Patents, https://patents.google.com/patent/EP2306073B1/en?oq=ep2306073 (Year: 2017).*

International Search Report dated Feb. 19, 2020 in PCT/EP2019/077969 filed on Oct. 15, 2019, 2 pages.

* cited by examiner

LUMINOUS MODULE FOR VEHICLE LIGHTING DEVICE WITH DEVIATING LIGHT GUIDE

TECHNICAL FIELD OF THE INVENTION

The present invention relates to the field of motor-vehicle lighting. More particularly, the present invention relates to a luminous module arranged so as to decrease stray light rays and/or to prevent the formation of the image of said stray rays.

BACKGROUND OF THE INVENTION

As known, luminous modules able to generate a pixelated beam the projection of which forms an image composed of pixels, i.e. units of illumination, already exist. Said pixels are organized into at least one horizontal and/or vertical row, and each of the pixels may be activated selectively.

Such an optical module is for example used in addition to a second optical module able to generate a main lighting and/or signaling beam with a view to forming a lighting and/or signaling beam integrating one or more AFS functions.

Alternatively, the optical module able to generate a pixelated beam is designed so as to produce on its own a lighting and/or signaling beam.

AFS is the abbreviation of "Advanced Front System". By way of example, in the case of a low beam, the pixelated beam is turned on with a bottom segment of the low beam to perform an additional lighting function, namely a bend-following function referred to as DBL (acronym of "Dynamic Bending Light"). This function allows the inside of the bend that the vehicle is taking or about to take to be illuminated.

In another application, the pixelated beam is turned on with a high-beam segment in order to perform a high-beam AFS function referred to as ADB (acronym of "Adaptive Driving Beam"), the aim of which is to offer a better visibility to the driver of the vehicle while avoiding subjecting the driver of an oncoming vehicle to glare.

Simplistically, an optical module able to generate a pixelated beam comprises a plurality of elementary light sources that are selectively activatable and arranged in a matrix array of elementary light sources, a plurality of light guides placed in front of said matrix array, and a projecting optical assembly that images the exit of the light guides.

However, it has been observed that certain configurations of the luminous module lead to the presence of stray light rays.

The light guides are on the whole arranged in parallel directions. Alternatively, the light guides may be distributed in a fan or in a semi-circle, each of the optical axes of the light guides being oriented toward the optical axis of the module.

Whatever the arrangement of the optical guides, the latter each comprise an entrance dioptric interface and an exit. The elementary light sources may be light-emitting diodes (LEDs).

The light sources are placed facing the entrance dioptric interfaces of all or some of the light guides. In other words, depending on the shape of the desired light beam, the number of light sources may be lower than the number of light guides.

In the case where the light sources are LEDs, sometimes the solid angle of the beam emitted by at least one of the LEDs intercepts an area larger than the area of the entrance dioptric interface located opposite. Consequently, a minority of these light rays are not collected by said entrance dioptric interface and propagate laterally, then enter by refraction into other light guides that are not intended therefor. These light rays then propagate inside these guides in the direction of the projecting optical assembly.

The stray rays are then observed in the image projected by the optical module, here a light beam comprising a main beam performing the desired optical function. Specifically, the stray rays are observed in the form of regions of higher light intensity in the main beam or of light spots outside the main beam. The presence of regions of higher light intensity or of light spots degrades the quality of the beam.

SUMMARY OF THE INVENTION

The technical problem that the invention aims to solve is therefore that of providing a pixelated beam with better lighting quality.

To this end, a first subject of the invention is a vehicle luminous module intended to generate a light beam along an optical axis, and comprising:
  primary light guides each comprising an entrance dioptric interface and an exit;
  a light source arranged facing an entrance dioptric interface;
  a projecting assembly comprising a focal region and an exit member, said projecting assembly being arranged so that the light rays passing through said focal region and reaching the exit member are imaged in a projection field downstream of said projecting assembly;
  the exits of the guides being arranged level with the focal region.

According to the invention, the luminous module comprises a secondary light guide distinct from the primary light guides, and arranged so as to deviate light rays generated by the light source so that they do not reach the exit member, and/or so as to spread said light rays in said projection field.

In the context of the invention, by "level with" what is meant is a location that includes "exactly on" or "slightly beside" but that is sufficiently close to form an image of these guide exits. Here, when the exits of the guides are located level with the focal region, said exits are placed slightly beside or exactly on the focal region so as to be imaged by the projecting assembly of the luminous module.

Here, by focal region what is meant is a surface of best object foci. It is a question of the surface placed closest to a set of object focal points.

Furthermore, by "projection field" what is meant is all of the space into which the projecting system projects the image.

The exit member may be the exit dioptric interface of the most downstream optical part of the projecting system, or a terminal optical part. For example, if this terminal optical part is a lens, and especially a secondary lens, the exit member is the exit dioptric interface of this lens. If this terminal optical part is a reflector, the exit member is the reflective surface of this reflector.

The rays deviated by the one or more secondary light guides therefore do not reach the exit member; in particular, they may be stopped during their travel by an absorbent surface toward which the one or more secondary guides deviate them, or indeed be deviated by the one or more secondary guides so as to follow a direct or indirect path that avoids the exit member.

Thus, by virtue of the one or more secondary light guides, the deviated light rays are not imaged in the projection field.

Thus, the deviated rays are therefore not projected, and do not appear in the projection field. Deviated rays are stray rays propagating through guides that are not intended for them.

Alternatively or in addition, the one or more secondary light guides reflect stray light rays so that when they reach the focal region they are widely spaced from one another. Specifically, on exiting the one or more secondary light guides, this beam of stray rays is spread so that the stray rays are divergent and widely spaced from one another when they reach the focal region. Consequently, the image of these stray rays is spread out in the projection field, this considerably decreasing the light intensity of the image of the stray rays.

Thus, by virtue of the secondary light guides, the risk of adding additional light intensity to the main beam and/or generating light spots outside the main beam is decreased. The luminous module according to the invention therefore generates a sharp and precise light beam of good quality.

Moreover, the luminous module according to the invention allows the risk of subjecting an on-coming driver to glare to be decreased.

The luminous module according to the invention may optionally have one or more of the following features:
- the luminous module comprises a plurality of secondary light guides;
- each secondary light guide comprises a free end facing which no light source is placed;
- the luminous module is arranged so that the image of the exits of the primary guides associated with the light source forms a strip of light in the projection field, said strip of light forming a segment of a lighting beam; by way of example, the strip of light forms a segment of a lighting beam containing a plurality of pixels, or units of illumination, that may be turned off or turned on selectively and independently of one another; in one example, said segment is called the first lighting-beam segment; furthermore, the luminous module according to the invention may be designed so as to generate a second lighting-beam segment that is complementary to the first segment in order to produce a complete lighting beam, one portion of which may be turned off or turned on independently of the other portion;
- alternatively, the luminous module according to the invention may be turned on in conjunction with other luminous modules in order to produce a lighting beam; by virtue of the quality of the luminous module according to the invention, the complete lighting beam also has an improved quality, which provides a better visibility to the driver;
- the primary light guides and the one or more secondary light guides are placed in the same horizontal row; the or at least one of the secondary light guides, which is called the first secondary light guide, is placed between two primary light guides; the first secondary light guide thus placed may receive stray light rays coming from both its sides, and in particular from the primary light guide located on its left and/or from the primary light guide located on its right;
- the primary light guides and the one or more secondary light guides are placed in the same horizontal row;
- the or at least one of the secondary light guides, which is called the second secondary light guide, is placed at one end of said horizontal row; thus, the second secondary light guide is able to intercept the stray light rays that escape laterally toward the sides of the luminous module;
- at least one secondary light guide extends longitudinally along a first axis substantially parallel to the optical axis of the module;
- at least one secondary light guide comprises lateral faces that are slightly curved inward in the direction of the first axis; thus, the curved lateral faces participate in refracting the stray rays that enter into the one or more secondary guides, so as to deviate the path of these stray rays and/or to spread the image of these rays over the projection field;
- at least one secondary light guide comprises two opposite lateral faces that are concave when viewed from outside said first guide; it is a question of an embodiment of the secondary light guides that is simple and effective;
- at least one secondary light guide comprises planar lateral faces; thus, the planar faces of the secondary guide reflect the stray rays back to the side from which they came, instead of allowing the stray rays to continue to propagate, with the aim of reaching the focal region of the projecting assembly;
- alternatively, it is possible to employ a combination of lateral faces of different shapes in the same secondary guide; for example, one secondary guide comprises a planar lateral face and a concave lateral face, or a planar lateral face and a convex lateral iii face, or a concave lateral face and a convex lateral face;
- at least one secondary light guide comprises a first entrance comprising a free end that is arranged substantially in the same plane as at least certain entrance dioptric interfaces of the primary light guides; the secondary light guide, thus designed, may be molded at the same time as the primary light guides without there being any need for a slider specific to said secondary light guide; this therefore simplifies the process for manufacturing the optical module;
- at least one secondary light guide comprises a free end that is offset longitudinally with respect to at least certain of the entrance dioptric interfaces of the primary light guides;
- in certain configurations of the optical module, the one or more secondary guides do not receive stray light rays to be deviated or to be spread in the segment located slightly in front of or level with the entrance dioptric interfaces of the primary light guides; consequently, it would therefore be pointless to extend it or them to level with said entrance dioptric interfaces; the one or more secondary guides are therefore shorter and less material is consumed manufacturing them; the luminous module comprising these one or more short secondary guides is lighter and therefore costs less;
- according to the previous paragraph and alternatively, the one or more secondary guides are longer than the primary guides; in this case, the free end of the one or more secondary guides may be used as a positioning and/or fastening member to position the set of guides with respect to a holder and/or to fasten the set of guides to said holder;
- the projecting assembly comprises a primary lens and a secondary lens that is placed away from and downstream of said primary lens, the primary lens receiving the rays that exit from the exits of the primary light guides and the rays that exit from the exit of the secondary light guide or that exit or that exit from the exits of the secondary light guides and sending them to the secondary lens; in other words, the primary lens and the secondary lens forming the projecting assembly that converges level with the focal region; alternatively, the projecting assembly may comprise more than two lenses;

the primary lens, the primary light guides and the one or more secondary light guides are made of the same material and integrally formed so as to form a one-piece optical part; thus, this makes it possible to decrease the number of separate components of the luminous module, and to make it easier to mount said module and achieve robustness to positioning tolerances;

the projecting assembly is composed of a single lens that converges level with the focal region so as to image the exits of the primary light guides; the projecting assembly, the primary light guides and the one or more secondary light guides are made of the same material and integrally formed into a single part; thus, the luminous module comprises a multifunctional, one-piece optical part that is compact and easy to mount;

the luminous module comprises a plurality of light sources, said light sources being arranged facing the entrance dioptric interfaces of all or some of the primary light guides; thus, the luminous module may be adapted depending on the needs of the specifications.

Another subject of the invention is a lighting device comprising a luminous module according to the invention.

In this document, unless specified otherwise, the terms "upstream" and "downstream" refer to the direction of propagation of the light in the object to which they refer, and also to the direction of emission of light out of said object.

Moreover, everything denoted "front" is located on the downstream side, whereas everything denoted "rear" is located on the upstream side.

The terms "horizontal", "vertical" or "transverse", "lower", "upper", "high", "low", and "side" are defined with respect to the orientation with which the luminous module according to the invention, or a component forming part of the luminous module according to the invention, is to be mounted in the vehicle. In particular, in this patent application, the term "vertical" designates an orientation perpendicular to the horizon, whereas the term "horizontal" designates an orientation parallel to the horizon.

BRIEF DESCRIPTION OF THE DRAWINGS

Other features and advantages of the invention will become apparent on reading the following detailed description of non-limiting examples, for the comprehension of which reference should be made to the appended drawings, in which:

FIG. 5 illustrates a rear portion of a prior-art optical part, which part is similar to the optical part of FIG. 2, but which comprises only primary light guides; FIG. 5 also illustrates, schematically, the traces of light rays emitted by two elementary light sources;

DETAILED DESCRIPTION

Figure 1:
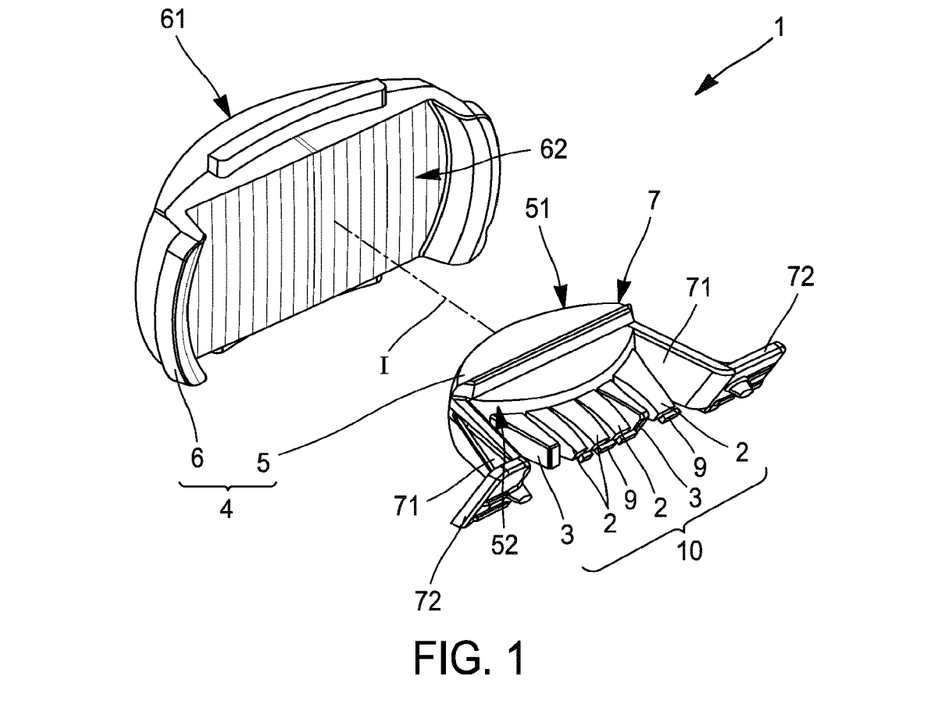
FIG. 1 illustrates a perspective view in a direction from upstream to downstream of a luminous module according to one exemplary embodiment of the invention.
Figure 2:
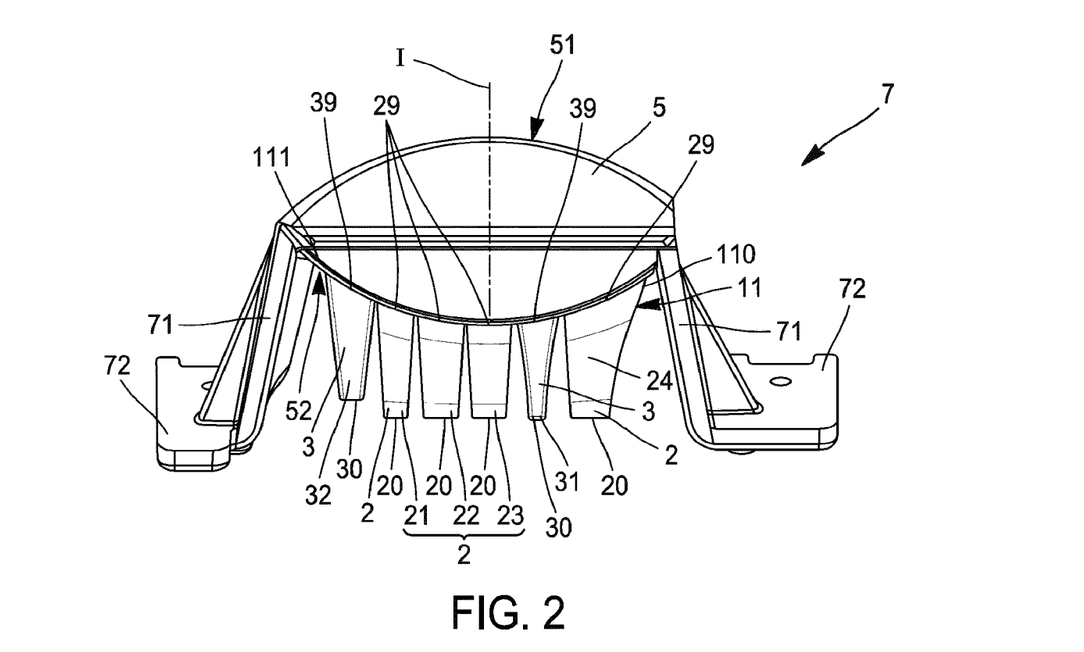
FIG. 2 illustrates a view from above of an optical part comprising light guides and a primary lens, said optical part forming part of the luminous module of FIG. 1.

With reference to FIG. 1 and FIG. 2, a luminous module 1 according to one exemplary embodiment of the invention is intended to generate a light beam in the direction of an optical axis I. The luminous module 1 comprises a plurality of light guides 10, a primary lens 5 and a secondary lens 6.

The light guides 10 may be divided into two categories, namely primary light guides 2 and secondary light guides 3. The primary light guides 2 are intended to shape a light beam emitted by at least one light source into a pencil beam output from these primary light guides 2. Each primary light guide 2 comprises an entrance dioptric interface 20 and an exit 29.

In the illustrated example, a light source 9, and especially a light-emitting diode 9, is placed opposite each entrance dioptric interface 20. Therefore, here, the number of diodes is equal to the number of primary light guides. In another example, the number of diodes may be lower than the number of primary light guides.

The secondary light guides 3 are only designed to refract and deviate stray light rays. By stray light rays, what is meant are rays that are generated by a light source placed upstream of a primary light guide 2 but that do not enter into said primary light guide 2, or that exit via one of the lateral faces of this primary guide 2 before reaching its exit. The secondary light guides 3 each comprise an exit 39 and a free end 30. No light source is placed facing the free end 30 of each of the secondary light guides 3. These secondary light guides 3 will be described in detail later on in the description.

In the remainder of the description, for the sake of readability, the terms "primary guides", "secondary guides", "stray rays" and "beam" will be used instead of "primary light guides", "secondary light guides", "stray light rays" and "light beam", respectively.

In the illustrated example, the primary lens 5 is a biconvex lens comprising, here, at the front, a main downstream face 51 and, here, at the rear, a main upstream face 52. The set of secondary and primary light guides protrudes toward upstream from this main upstream face 52.

The secondary lens 6 is placed away from and downstream of the primary lens 5, so as to receive the rays that exit from the main downstream face 51 of said primary lens 5. The secondary lens 6 here comprises, at the front, a secondary downstream face 61, and, at the rear, a secondary upstream face 62. In FIG. 1, the secondary upstream face 62 shown is planar, but it may be slightly convex when viewed from outside the lens 6.

The primary lens 5 and the secondary lens 6 are arranged so as to form a projecting assembly 4 having a focal region F that is level with, or that even conforms to, the main upstream face 52 of the primary lens 5. In this way, the light rays output from the primary and/or secondary guides are imaged by the projecting assembly 4 while minimizing optical field aberrations.

With reference to FIG. 2, six light guides, namely four primary guides 2 and two secondary guides 3, are illustrated. All guides are placed in a horizontal row 11.

Three primary guides 2 are placed side by side and are called, in order from left to right in FIG. 2, the first, the second, and the third primary guide 21, 22 and 23, respectively. The fourth primary guide 24 is placed at a right end 110 of the horizontal row 11. Each of the primary guides 2 comprises an entrance dioptric interface 20 and an exit 29. One elementary light source 9, here a light-emitting diode or LED, is placed in front of each entrance dioptric interface 20.

A first secondary guide 31 is placed between the third and fourth primary guides, 23 and 24. A second secondary guide 32 is placed at a left end 111 of the horizontal row 11. Each of the secondary guides 3 comprises here, at the front, an exit 39, and here, at the rear, a free end 30.

As described above, the exits of the primary and secondary guides 20 and 30 are arranged on the main upstream face 52 of the primary lens 5. The projecting assembly 4 is configured so that the focal region F includes this main upstream face 52 of the primary lens 5 so as to project to infinity any ray that exits from the primary and secondary guides 2 and 3 via their exit 29, 39.

Consequently, the primary lens 5 receives the rays that exit from the exits of the primary guides 2 and the rays that exit from the secondary guides 3. The primary lens 5 then sends them to the secondary lens 6.

Here, the focal region F has a curved surface that passes through the exits 29 of the primary guides 2 and the exits 39 of the secondary guides 3. The focal region F is illustrated in FIG. 3.

In this example, the six light guides 21 to 24, 31, 32 and the primary lens 5 are formed into a single one-piece optical part 7.

This one-piece optical part 7 comprises lateral fins 71 each comprising one attachment foot 72. The latter is intended to be affixed to a holder (not illustrated in the figures). The attachment feet 72 are fastened, in particular by screwing, to the holder in order to keep the single-piece optical part 7 in position in the luminous module 1.

Figure 3:
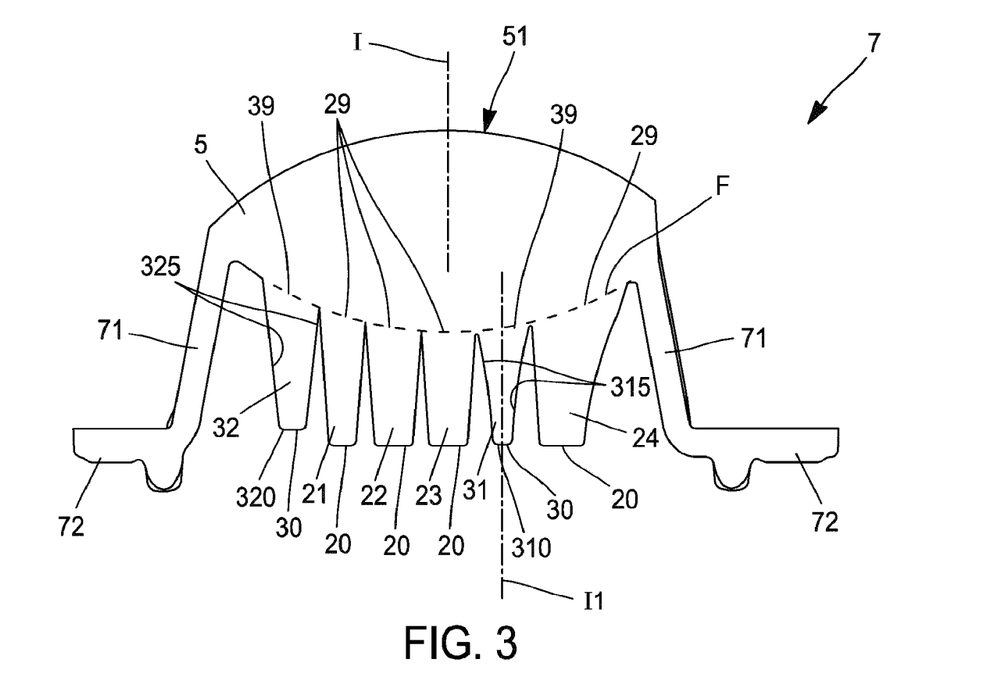
FIG. 3 illustrates a schematic view of a horizontal cross section of the optical part of FIG. 2.

In FIG. 3, a horizontal cross section of the one-piece optical part 7 is illustrated. Horizontal cross sections of the primary guides 21 to 24 and secondary guides 31, 32 may therefore be seen therein.

In particular, the first secondary guide 31 extends longitudinally parallel to the optical axis of the luminous module. The longitudinal axis of the first secondary guide 31 is called the first axis I1. The first secondary guide 31 comprises two lateral faces 315 that are slightly curved inward in the direction of the first axis I1. In other words, the lateral faces 315 of the first secondary guide 31 are concave faces, when viewed from outside said first guide 31. In other words, the lateral faces 315 of the first secondary guide 31 are convex when viewed from inside the secondary guide 31, i.e. considering the path of the light rays propagating inside said first secondary guide 31.

In this example, the free end 310 of the first secondary guide 31 is substantially coplanar with the entrance dioptric interfaces 20 of the primary guides 2.

As for the second secondary guide 32, the latter comprises planar lateral faces 325. Furthermore, the free end 320 of the second secondary guide 32 is offset longitudinally to downstream with respect to the entrance dioptric interfaces 20 of the primary guides 2.

Here, the length of the two secondary guides 3 and the shape of all their faces, and in particular their lateral faces, are defined so as to intercept and deviate the rays creating the stray light. A shape other than that shown in the figures could therefore be employed. In particular, the shapes that apply to the first secondary guide may also apply to the second secondary guide. Conversely, the shapes that apply to the second secondary guide may also apply to the first secondary guide.

Figure 4:
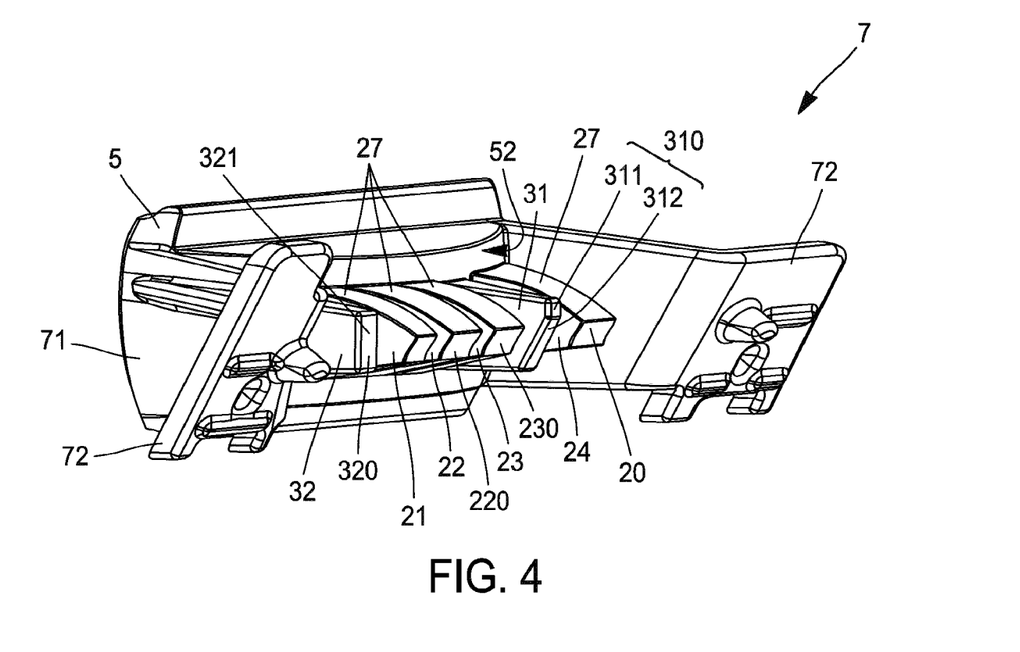
FIG. 4 illustrates a perspective view in a direction from upstream to downstream of the optical part of FIG. 2.

FIG. 4 shows the rear of the primary and secondary guides 2, 3. Here, the primary guides 2 each have an upper face 27 that curves downward slightly. The entrance dioptric interface 20 of each of these guides 2 has, here, a curved surface that is slightly inclined with respect to vertical.

As regards the first secondary guide 31, in this example, the free end 310 of said first guide 31 is composed of a plurality of facets, here two in number, namely an upper facet 311 and a lower facet 312. The lower facet 312 of the free end 310 is located substantially in the same plane as the entrance dioptric interfaces 20 of the primary guides 2. The lower facet 312 is therefore also slightly inclined with respect to the vertical.

Unlike the first secondary guide 31, the free end 320 of the second secondary guide 32 comprises a single facet 321 that is parallel to the vertical direction. The second secondary guide 32 therefore has the shape of a truncated pyramid with the exit forming the large base and the free end the small base.

FIGS. 5, 5A, 5B, 6, 6A and 6B, which are described below, further explain the operation and the technical advantage of the secondary guides 31, 32 in the luminous module 1 according to one exemplary embodiment of the invention, with respect to a luminous module without any secondary guides.

Figure 5:
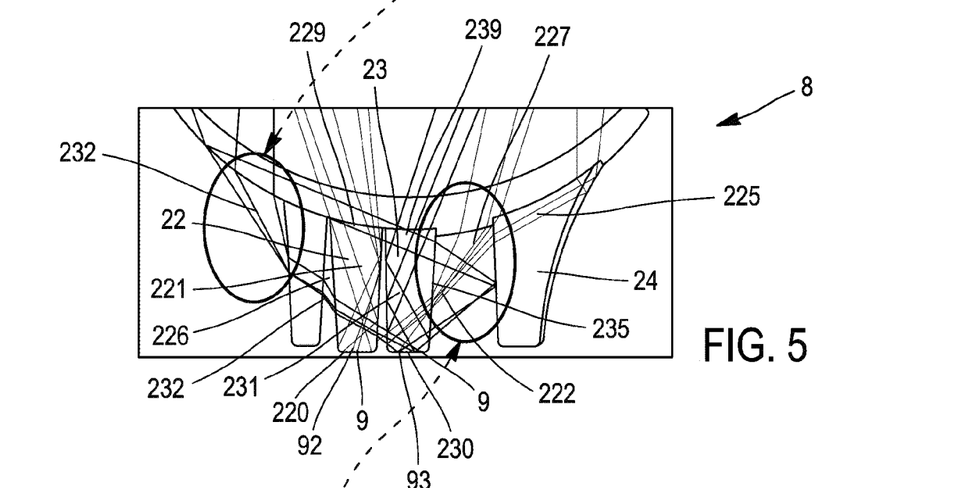
Figure 6:
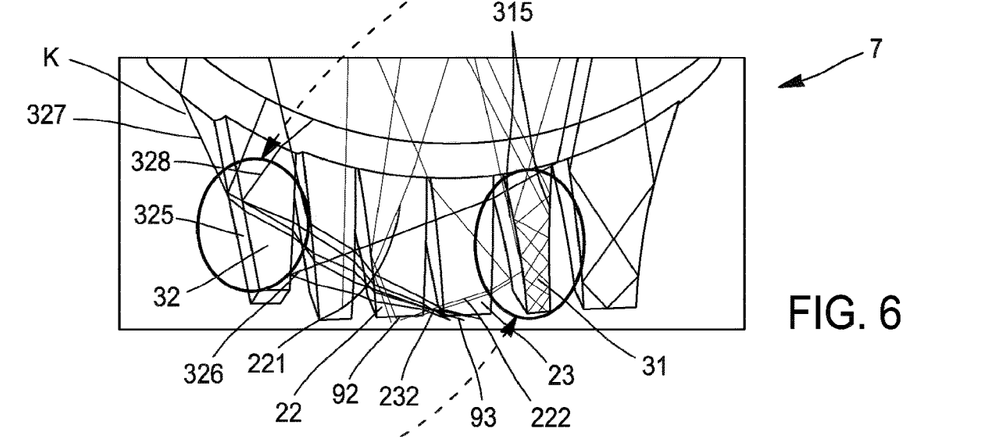
FIG. 6 illustrates a rear portion of the optical part of FIG. 2 and light beams emitted by two elementary light sources.

With reference to FIG. 5, an optical part 8 similar to the optical part 7 shown in FIG. 2 and FIG. 6 is illustrated. However, the optical part 8 of FIG. 5, which is called the comparative optical part 8, does not comprise any secondary guides. It comprises only primary guides that, however, are the same in number and in the same arrangement as those in FIG. 2. The primary guides of the comparative optical part 8 have therefore been designated with the same references as those of the primary guides of the optical part 7 shown in FIG. 2 and in FIG. 6.

Two elementary light sources, here two LEDs, are placed in front of the second primary guide and the third primary guide, respectively. The LED 92 placed opposite the entrance dioptric interface 220 of the second primary guide 22 is called the second LED 92 below, whereas the LED 93 placed opposite the entrance dioptric interface 230 of the third primary guide 23 is called the third LED 93.

In FIG. 5, beams emitted by these two LEDs 92 and 93 are also illustrated.

More precisely, the second LED 92 emits a beam a main portion of which, containing most of the rays of this beam, propagates inside the second primary guide 22. This main portion of the beam is called the primary second beam 221 below. This primary second beam 221 propagates through the second primary guide 22 until it reaches the exit 229 of said guide 22, and then the focal region F. The primary second beam 221 is thus imaged by the projecting assembly 4.

The image of the primary second beam 221 forms a pixel 224 with a slightly rectangular shape. This pixel 224 is called the second pixel 224 and is illustrated in FIG. 5A and in FIG. 5B.

It will be noted that the image of the exits of light guides 2, is inverted with respect to their structural arrangement. Specifically, the image of the beams output by the second primary guide 22 is located to the right in FIGS. 5A and 5B, whereas the image of the beams output by the third primary guide 23 is located to the left in FIGS. 5A and 5B. However, structurally, the second primary guide 22 is located to the left of the third primary guide 23, with respect to the direction of emission of the light.

Figure 5A:
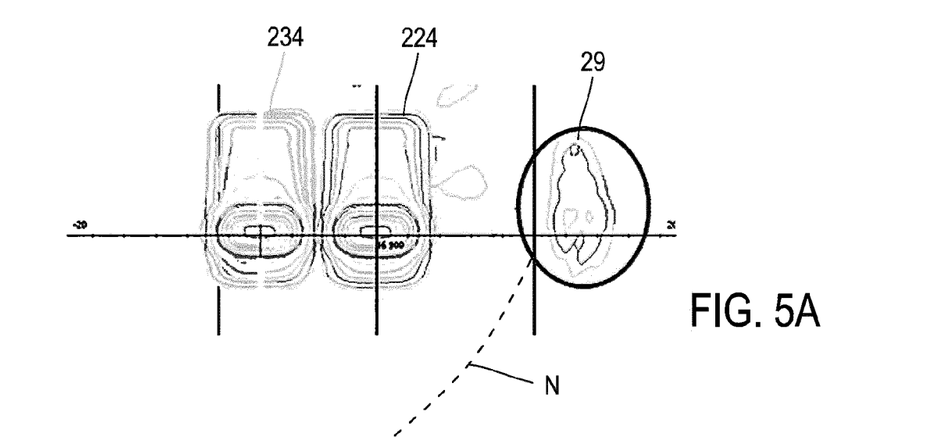
FIG. 5A illustrates the image comprising a strip of light generated by a luminous module comprising the optical part of FIG. 5, and a first image region of stray light rays; said image takes the form of isolux curves projected onto a vertical screen, especially at a distance of 25 meters in front of a luminous module comprising the optical part of FIG. 5.
Figure 5B:
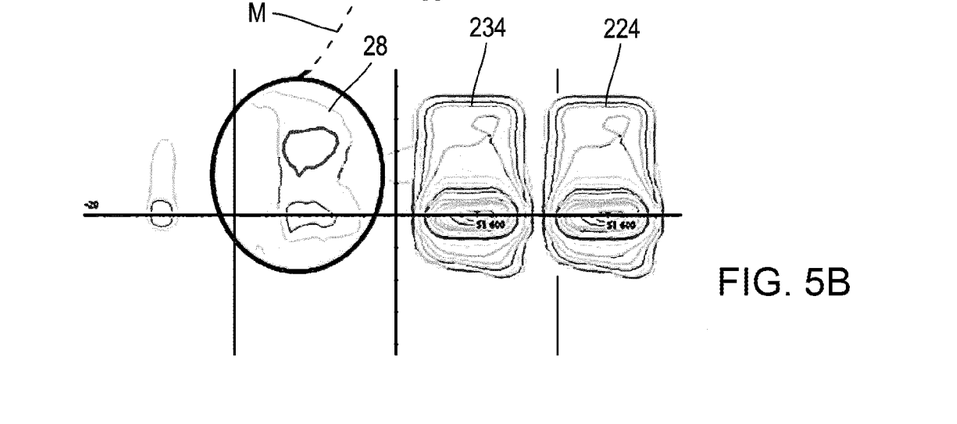
FIG. 5B illustrates the same image with the strips of light as FIG. 5A and shows a second image region of stray light rays.

Consequently, the image of the primary second beam 221, which here forms the second pixel 224, is the pixel located to the right in FIG. 5A and in FIG. 5B.

The beam emitted by the second LED 92 comprises yet another beam portion, called the secondary second beam 222. Unlike the primary second beam 221, the secondary second beam 222 does not enter into the second primary guide 22 and is emitted rightward with respect to the direction of emission of the light, i.e. here also rightward in FIG. 5. The secondary second beam 222 passes by refraction laterally through the third primary guide 23. It thus exits the third primary guide 23 via the right lateral edge 235 thereof and is divided into two portions.

A first portion 227 of the secondary second beam 222 reaches the focal region F. A second portion 225 of the secondary second beam 222 enters by refraction into the fourth primary guide 24 before reaching the focal region F.

Therefore, the first and the second portions 227 and 225 of the secondary second beam 222 are also imaged by the projecting assembly 4.

The image of the first portion 227 of the secondary second beam 222 is illustrated in FIG. 5B. It forms a light spot 28 with an irregular shape. In other words, this spot 28 forms a stray image in the image of the beam generated by the luminous module. For the sake of legibility of the figures, a dashed arrow M has been shown to indicate the correspondence between the secondary second beam 222, or more precisely, the first portion 227 thereof, and its on-screen image in FIG. 5B. The spot 28 is located, here, to the left of the second and third pixels 224, 234 in FIG. 5B.

Likewise, the image of the second portion 225 of the secondary second beam 222 will form a stray image in the image of the beam generated by the luminous module.

Thus, the secondary second beam 222 is a beam of stray light rays.

The same effect arises with the third primary light guide 23 and the third LED 93.

As illustrated in FIG. 5, the third LED 93 emits a beam a main portion of which containing most of the rays of the beam propagates the entire length of the third primary guide 23 to then reach the exit 239 and then be projected downstream by the projecting assembly 4. This main portion of this beam is called the primary third beam 231 below.

The image of the third primary beam 231 is a pixel 234 located to the left in FIGS. 5A and 5B. This pixel is called the third pixel 234. The latter has a similar shape to the second pixel 224, namely a substantially rectangular shape.

Thus, the second pixel 224 and the third pixel 234, which are placed side by side, form one portion of a strip of light that the luminous module 1 is capable of generating. The strip of light may be turned on in addition to other basic light segments to form a lighting and/or signaling beam.

The beam emitted by the third LED 93 also comprises another beam portion, called the secondary third beam 232. This passes beside the third primary guide 231 and to the left. The secondary third beam 232 enters into the second primary guide 22 and passes through the latter transversely. It then exits from the second primary guide 22 via its left lateral edge 226, further passes by refraction through the first primary guide 21, and then is directed to the focal region F.

The secondary third beam 232 is therefore imaged by the projecting assembly 4. Its image is illustrated in FIG. 5A. It is a spot 29 of an irregular shape, located on the right side of the second and third pixels 224 and 234 in FIG. 5A.

To facilitate identification, an arrow N shows the correspondence between the secondary third beam 232 and its on-screen image in FIG. 5A.

The secondary third beam 232 is also considered to be a beam of stray light rays.

The presence of the light spots 28 and 29 due to the secondary second beam 222 and the secondary third beam 232 is detrimental to the quality of the beam generated by the luminous module comprising this optical part 8.

Specifically, these spots 28 and 29 may add additional light intensity to the pixels of neighboring guides, i.e. pixels that are generated by guides located on either side of the second primary guide 22 and/or the third primary guide 23. Thus, the value of the light intensity, measured where these spots 28 and 29 and the pixel superpose, generates visual discomfort.

Furthermore, these light spots 28, 29 prevent the pixels formed by the neighboring light guides from being completely turned off. Specifically, when the light sources placed facing neighboring guides are turned off, the corresponding pixels are also turned off. However, if the second and third LEDs 92 and 93 remain on, the beams of stray rays 222, 232 persist. Thus, the light spots 28, 29 remain turned on in the location of the pixels of the neighboring guides, which however are turned off.

In addition, these light spots 28, 29 may be located in a region in which it is not desired to have light, and especially in a location in which another followed or on-coming vehicle is present. There may therefore be residual light, which may cause glare to an on-coming driver or a driver of a followed vehicle.

In light of these disadvantageous effects of stray rays, the applicant proposes a luminous module 1 such as illustrated in FIGS. 1 to 4 and 6 and described above. Of course, it is a question of one embodiment among many other embodiments that are possible while remaining within the scope of the invention.

Figure 6A:
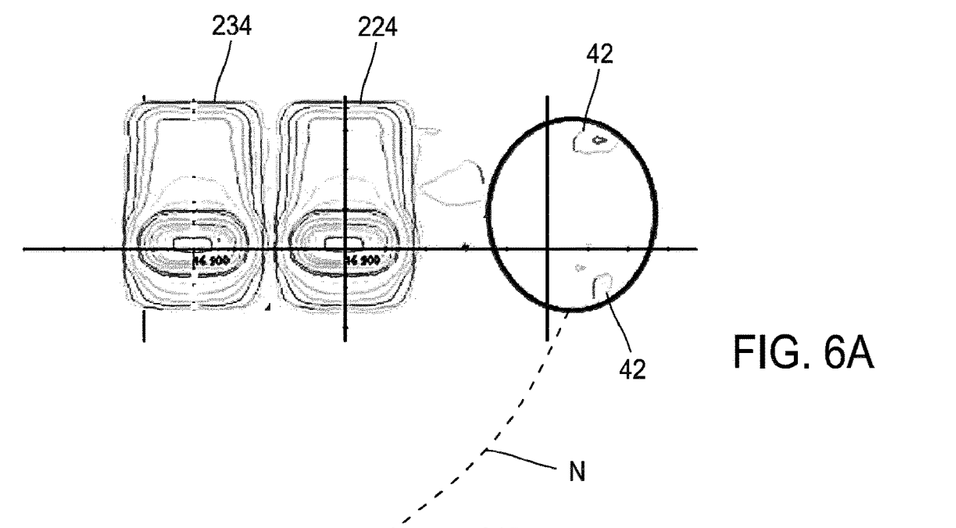
FIG. 6A illustrates the image comprising a strip of light generated by the luminous module of FIG. 1, namely the luminous module comprising the optical part of FIG. 2, and a first image region of stray light rays; said image takes the form of isolux curves projected onto a vertical screen, especially at a distance of 25 meters in front of the luminous module of FIG. 1.
Figure 6B:
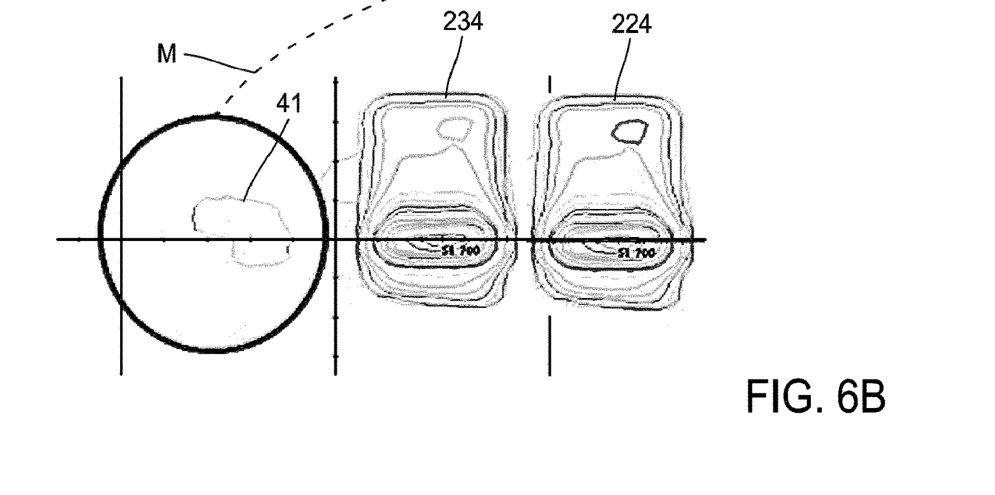
FIG. 6B illustrates the same image with the strips of light as FIG. 6B and shows a second image region of stray light rays.

FIGS. 6, 6A and 6B, which are described below, will allow the operation and the advantageousness of the luminous module according to the invention as described above to be better understood.

With respect to the optical part 8 of FIG. 5, the optical part 7 of FIG. 6 in addition comprises the first secondary guide 31 and the second secondary guide 32.

The optical part 7 of FIG. 6 still comprises the second and third LEDs 92 and 93, and the same primary guides 21 to 24 as those of FIG. 5. The second and third primary guides 22 and 23 thus form the second and third pixels 224 and 234, respectively.

As in the previous case, the second pixel 224 is on the right in FIGS. 6A and 6B whereas the third pixel 234 is on the left in the same figures.

As regards the first secondary guide 31, the latter receives light rays passing from the second LED 92 rightward with respect to the direction of emission of the light, i.e. here also rightward in FIG. 6. More precisely, the first secondary guide 31 receives, here, the secondary second beam 222 emitted by the second LED 92.

The lateral faces 315 of the first secondary guide 31 are curved to increase the effect of deviation of the rays. Inside the first secondary guide 31, the rays of the secondary second beam 222 are reflected multiple times so that, on exiting from said first guide 31, the rays are multidirectional and therefore do not form a collimated beam. Consequently, the image of the light rays exiting from the first secondary guide 31 is spread in the image of the beam obtained on the screen. Where the spot 28 appeared in FIG. 5B, now only a small low-intensity spot 41 appears.

Thus, the first secondary guide 31 decreases the concentration of the stray light.

As regards the second secondary guide 32, the latter receives stray rays propagating leftward with respect to the direction of emission of the light, i.e. here also leftward in FIG. 6. Here, the second secondary guide 32 receives rays emitted by the third LED 93, or more precisely the rays of the secondary third beam 232.

The rays of said secondary third beam 232 are reflected inside the second secondary guide 32 so as to form the various beam portions listed below.

A first portion 326 of these rays is reflected back to the side from which they came, i.e. toward the third primary guide 23.

A second other portion 327 of these rays, as indicated by the line K in FIG. 6, is diverted radially outward from the place where they previously struck the focal region F, and hence away from the interior of the secondary lens 6. Thus, they are transmitted by the primary lens 5 but do not reach the secondary upstream face 62 of the secondary lens 6.

Specifically, the secondary downstream face 61 forms the exit member. A region allowing the rays to reach it is the space immediately in front of the secondary downstream face 61. Another region allowing the secondary downstream face 61 to be reached is the passage through the secondary upstream face 62. Here, the second portion 327 of the stray rays are deviated so as to pass beside the secondary upstream face 62.

Thus, the rays of said portion 327 do not enter into the secondary lens 6, they are therefore not imaged in the projection field of the projecting assembly 4.

A third portion 328 of the rays are reflected a multitude of times in the second secondary guide 32 so that their image is spread over the screen.

In the end, few of the rays that exit from the second secondary guide 32 are able to be imaged by the projecting assembly 4 in such a way as to produce an image of sufficient intensity to be detectable on the screen. A minority of the imaged rays form very small low-intensity spots 42 on the screen. These spots are shown in FIG. 6A.

The second secondary guide 32 therefore limits or prevents the formation of notable stray images in the image of the beam generated by the luminous module 1.

Thus, by virtue of the first and second secondary guides 31 and 32, the luminous module 1 according to the invention and according to the example described above generates a light beam containing very minor stray images, or even a light beam free of stray images. The light beam generated by such a luminous module therefore has an improved quality, this providing a better visibility to the driver.

Of course, it is possible to make many modifications to the invention without departing from the scope thereof.

It is possible for a module to contain solely one or more than one secondary guide(s) on one edge or solely one or more than one secondary guide(s) between 2 primary guides or even one or more than one secondary guide(s) of each type.

Depending on the desired deviations, the lateral faces of the secondary guides may be planar, concave or convex, irrespectively of whether they are at the end or between the primary guides.

The free edges of the secondary guides may be at least partly coplanar with the entrance surfaces of the primary guides or have different shapes.

The secondary guides may be longer or shorter than the primary guides, irrespectively of whether they are at the end or between the primary guides.

The invention claimed is:

1. A vehicle luminous module intended to generate a light beam along an optical axis, and comprising:
    primary light guides each comprising an entrance dioptric interface and an exit;
    a light source arranged facing a respective entrance dioptric interface of at least one primary light guide;
    a projecting assembly comprising a focal region and an exit member, said projecting assembly being arranged so that light rays passing through said focal region and reaching the exit member are imaged in a projection field downstream of said projecting assembly, wherein exits of the primary light guides are arranged level with the focal regions; and
    one or more secondary light guides placed in a same horizontal row as the primary light guides, and arranged so as to deviate stray light rays from the exit member, deviate said stray light rays to spread in said projection field, or both deviate said stray light rays from the exit member and deviate said stray light rays to spread in said projection field, wherein said stray light rays are generated by the light source but do not reach a respective exit of said at least one primary light guide.

2. The luminous module as claimed in claim 1, wherein each secondary light guide comprises a free end facing which no light source is placed.

3. The luminous module as claimed in claim 2, wherein at least one secondary light guide extends longitudinally along a first axis substantially parallel to the optical axis of the luminous module, and in that said at least one secondary light guide comprises lateral faces that are slightly curved inward in the direction of the first axis.

4. The luminous module as claimed in claim 2, wherein at least one secondary light guide comprises two opposite lateral faces that are concave when viewed from outside the at least one secondary light guide.

5. The luminous module as claimed in claim 2, wherein at least one secondary light guide comprises planar lateral faces.

6. The luminous module as claimed in claim 1, wherein it is arranged so that the image of the exits of the primary light guides associated with the light source forms a strip of light in the projection field, said strip of light forming a segment of a lighting beam.

7. The luminous module as claimed in claim 1, wherein at least one secondary light guide extends longitudinally along a first axis substantially parallel to the optical axis of the luminous module, and in that said at least one secondary light guide comprises lateral faces that are slightly curved inward in the direction of the first axis.

8. The luminous module as claimed in claim 1, wherein at least one secondary light guide comprises two opposite lateral faces that are concave when viewed from outside the at least one secondary light guide.

9. The luminous module as claimed in claim 1, wherein at least one secondary light guide comprises planar lateral faces.

10. The luminous module as claimed in claim 1, wherein at least one secondary light guide comprises a first entrance comprising a free end that is arranged substantially in the same plane as at least certain entrance dioptric interfaces of the primary light guides.

11. The luminous module as claimed in claim 1, wherein at least one secondary light guide comprises a free end that is offset longitudinally with respect to at least certain of the entrance dioptric interfaces of the primary light guides.

12. The luminous module as claimed in claim 1, wherein the projecting assembly comprises a primary lens and a secondary lens that is placed away from and downstream of said primary lens, the primary lens receiving the rays that exit from the exits of the primary light guides and the rays that exit from the exit of the secondary light guide or that exit from the exits of the one or more secondary light guides and sending them to the secondary lens.

13. The luminous module as claimed in claim 12, characterized in that the primary lens, the primary light guides and the one or more secondary light guides are made of the same material and integrally formed so as to form a one-piece optical part.

14. The vehicle luminous module as claimed in claim 1, wherein the projecting assembly comprises a single lens that converges to be level with the focal region so as to image the exits of the primary light guides, and in that the projecting assembly, the primary light guides and the one or more secondary light guides are made of the same material and integrally formed into a single part.

15. The vehicle luminous module as claimed in claim 1, wherein it comprises a plurality of light sources, said light sources being arranged facing the entrance dioptric interfaces of all or some of the primary light guides.

16. A vehicle lighting device, wherein it comprises a luminous module as claimed in claim 1.

17. The luminous module as claimed in claim 1, wherein at least one of the one or more secondary light guides, which is called a first secondary light guide, is placed between two primary light guides.

18. The luminous module as claimed in claim 1, wherein at least one of the one or more secondary light guides, which is called a second secondary light guide, is placed at one end of said horizontal row.

19. A vehicle luminous module intended to generate a light beam along an optical axis, and comprising:
   primary light guides each comprising an entrance dioptric interface and an exit;
   a light source arranged facing an entrance dioptric interface;
   a projecting assembly comprising a focal region and an exit member, said projecting assembly being arranged so that rays of light passing through said focal region and reaching the exit member are imaged in a projection field downstream of said projecting assembly, wherein the exits of the guides being arranged level with the focal region; and
   one or more secondary light guides distinct from the primary light guides, and arranged so as to deviate light rays generated by the light source so that said light rays do not reach the exit member, deviate said light rays to spread said light rays in said projection field, or both deviate said light rays so that said light rays do not reach the exit member and deviate said light rays to spread said light rays in said projection field,
   wherein the primary light guides and the one or more secondary light guides are placed in a same horizontal row, and in that at least one of the one or more secondary light guides, which is called a first secondary light guide, is placed between two primary light guides.

20. A vehicle luminous module intended to generate a light beam along an optical axis, and comprising:
   primary light guides each comprising an entrance dioptric interface and an exit;
   a light source arranged facing an entrance dioptric interface,
   a projecting assembly comprising a focal region and an exit member, said projecting assembly being arranged so that rays of light passing through said focal region and reaching the exit member are imaged in a projection field downstream of said projecting assembly, wherein the exits of the guides being arranged level with the focal region; and
   one or more secondary light guides distinct from the primary light guides, and arranged so as to deviate light rays generated by the light source so that said light rays do not reach the exit member, deviate said light rays to spread said light rays in said projection field, or both deviate said light rays so that said light rays do not reach the exit member and deviate said light rays to spread said light rays in said projection field,
   wherein the primary light guides and the one or more secondary light guides are placed in a same horizontal row, and in that at least one of the one or more secondary light guides, which is called a second secondary light guide, is placed at one end of said horizontal row.

* * * * *